2 Sheets—Sheet 1.
E. S. WILHITE.
BAND CUTTER AND FEEDER.
No. 11,349. Reissued July 4, 1893.
Fig. 1
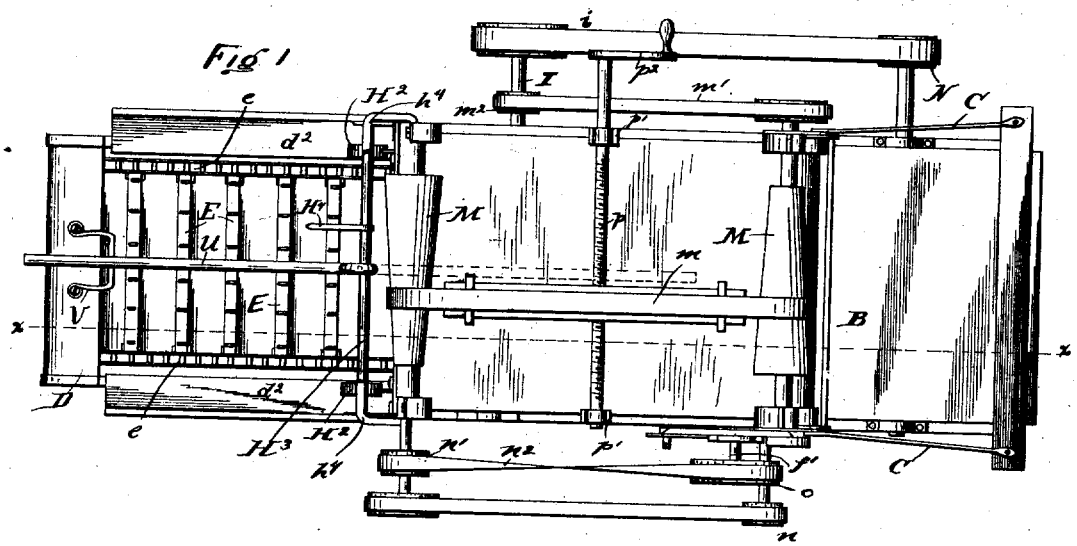
Fig. 2.
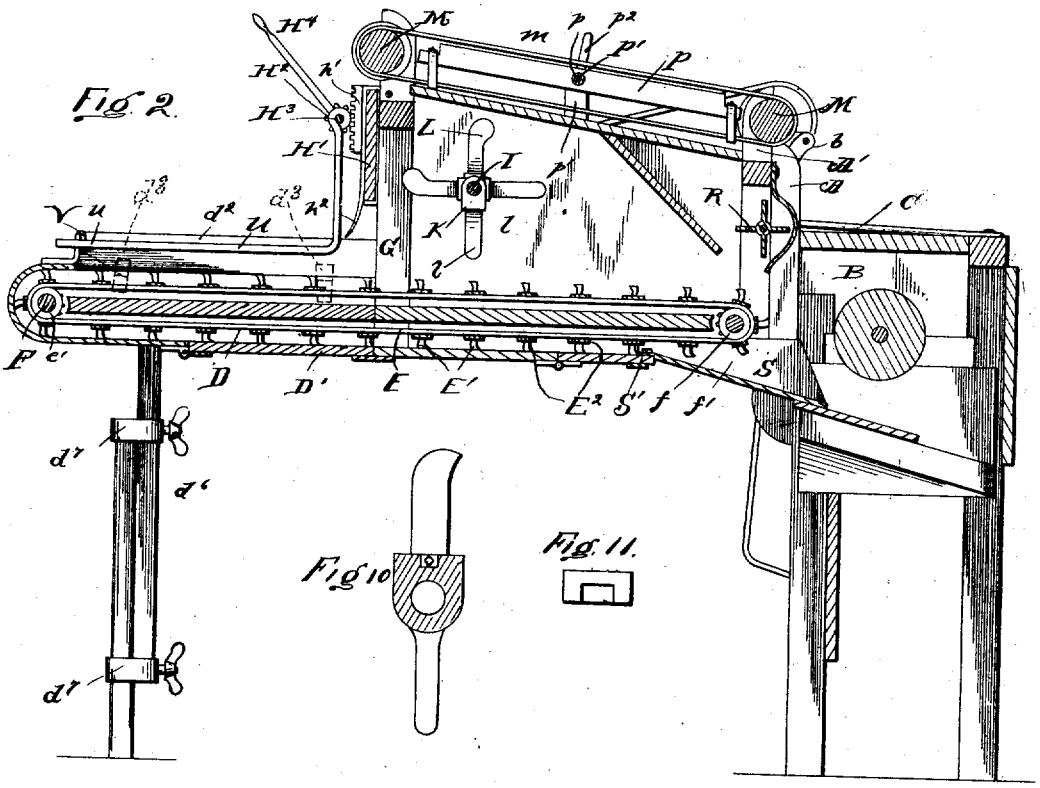
Fig. 10
Fig. 11.
WITNESSES:
C. J. Cross
A. L. Norton
INVENTOR
Edmund S. Wilhite
BY
Fred W. Bond
ATTORNEY.

E. S. WILHITE.
BAND CUTTER AND FEEDER.
No. 11,349. Reissued July 4, 1893.
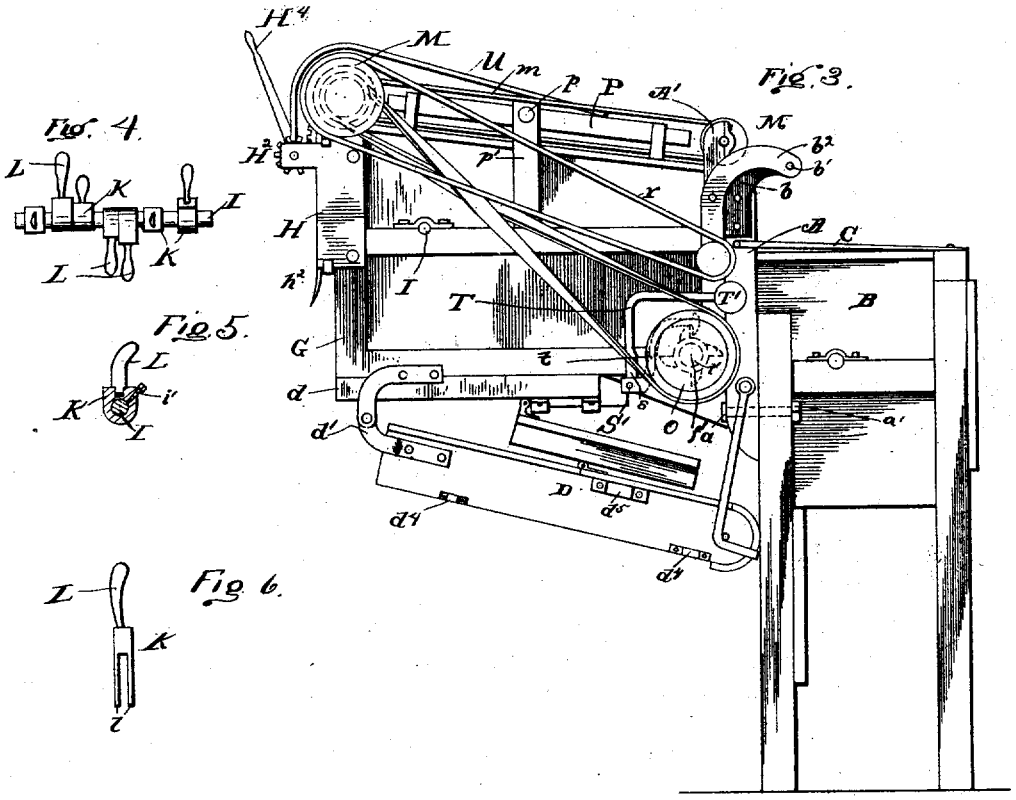
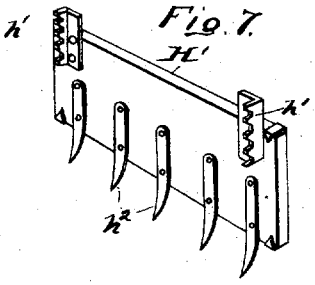
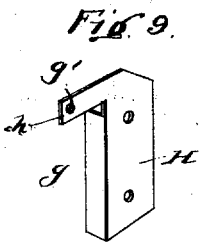
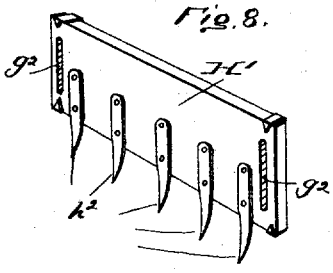
WITNESSES:
J. Cross.
A. L. Norton.
INVENTOR
Edwin S. Wilhite
BY
Fred W. Bond
ATTORNEY.

UNITED STATES PATENT OFFICE.

EDMUND S. WILHITE, OF WEST SALEM, ILLINOIS.

BAND-CUTTER AND FEEDER.

SPECIFICATION forming part of Reissued Letters Patent No. 11,349, dated July 4, 1893.

Original No. 448,102, dated March 10, 1891. Application for reissue filed August 15, 1891. Serial No. 402,768.

*To all whom it may concern:*

Be it known that I, EDMUND S. WILHITE, a citizen of the United States, residing at West Salem, in the county of Edwards and State of Illinois, have invented certain new and useful Improvements in Band-Cutters and Feeders, of which the following is a specification.

The present invention relates to band-cutters and feeders; and it consists in the novel arrangement and construction of parts, as will be hereinafter fully set forth and claimed.

In the accompanying drawings, making part of this application, Figure 1 is a top plan view of a band-cutter and feeder constructed according to my invention and attached to the front end of a thrashing-machine. Fig. 2 is a section taken on the plane indicated by the line *x x*, Fig. 1. Fig. 3 is a side elevation thereof with the side-boards and supports removed, showing part of the device folded. Fig. 4 is a detached view of the shaft carrying the knife-holders and knives. Fig. 5 is a cross-section of one of the knife-holders, showing a knife secured therein. Fig. 6 is a modification of the knife-holder, showing the grain-spreading portion. Fig. 7 is a perspective view of the sliding-board, showing the rack-bars and fingers. Fig. 8 is a perspective view of a modification thereof. Fig. 9 is a perspective view of the flanged bracket. Fig. 10 is an enlarged sectional view of the knife-holder, showing means of securing the knife thereon; and Fig. 11 is a top view of the holder with the knife removed.

The same letters of reference denote the same parts throughout the several figures.

The rear frame A of the band-cutter and feeder is constructed in the usual way, so as to conform to the front of a thrashing-machine B, and is attached thereto by means of bolts *a*, which pass through the respective frames and receive suitable nuts *a'*.

The frame A has attached on either side near its top a hinged plate *b*, having a crooked or curved end projecting beyond said frame which is provided with an aperture *b'*, which registers with an aperture in a like plate $b^2$, secured to the top of the uprights A'. A brace C is attached to the frame A at one end, while the other end is attached to the front of the thrashing-machine. By this hinged attachment the band-cutter and feeder can be lifted up and thrown backward, leaving the front of the thrashing-machine exposed and rendering it more convenient to be cleaned or repaired without detaching the band-cutter and feeder from the machine.

D represents the receiving-box for the sheaves, and is hinged or pivoted to the lower frame *d* by means of hinge-brackets *d'*, secured to said box and frame on either side.

The box D has detachable side-boards $d^2$, which are provided with angle-pieces $d^3$, arranged to enter supporting-brackets $d^4$ on the outside of the box D at either end, and in the center of said sides is a like bracket $d^5$, which rests on the shoulder of a supporting-leg $d^6$, made in two parts, each part being provided with a rectangular sleeve $d^7$, having a screw-threaded aperture to receive a suitable set-screw, by means of which and the said sleeves the supporting-legs $d^6$ can be adjusted when the machine is located on uneven ground. One of the sleeves $d^7$, being secured to the opposite ends of the two parts which form the supporting-legs $d^6$, allows such parts to slide upon each other when released by the set-screws. The middle portion of the floor D' of the receiver D is made in two parts and hinged at the back and front for convenience in folding.

In folding the box D back, as shown in Fig. 3 of the drawings, the side-boards and supporting-legs are removed, leaving the box and endless apron free to be carried backward and hooked to the rear of the band-cutter and feeder.

E denotes an endless carrier apron, upon which the sheaves are thrown and carried into the machine by a series of crooked or bent spikes E', projecting from the slats or cross-bars $E^2$ of the apron E, which is propelled by a drive-chain *e*, attached to the ends of the cross-bars $E^2$ of the apron, engaging a sprocket-wheel *e'* on the shaft F at the front of the box D and a like sprocket-wheel *f* on the shaft *f'*, said shaft being driven by a suitable driving-pulley.

The front frame G is provided with brackets H, having a flange *g* and a right-angled projection *h*, which has an aperture *g'*. These brackets are secured on the outside of the frame on either side so as to leave sufficient space between the flange *g* and the front of the frame G for a sliding board H′, which is provided at either end on its front with rack-bars $h'$ and along its lower portion with curved teeth or guide-fingers $h^2$. This board H′ is moved up and down, according to the size of the sheaves, by means of two gear-wheels $H^2$, located on the ends of a shaft $H^3$, which is provided with a handle $H^4$ securely attached thereto, and which extends upward from the said shaft. Suitable pawls $h^4$ are provided, so as to catch and hold the board H′ in whatever position it is placed by moving the handle $H^4$, and hence the shaft $H^3$ and the wheels $H^2$, which gear into the rack-bars $h'$, as clearly shown in Figs. 1 and 7.

The above described board, with its fingers, forms a regulating device for the sheaves and only allows a proper number of them to be carried into the machine at once. A modified form of such regulator is shown in Fig. 8 of the drawings, wherein the board H′ extends entirely across the apron E, on which the sheaves are deposited, and is secured to the front frame G by set-screws or bolts which pass through the slots $g^2$, and leave the board free to move up and down and not choke the feed.

Just behind the finger board H′ and at a suitable distance from the above the endless apron is located a shaft I, provided with a pulley $i$ and journaled in the sides of the cutting and feeding machine. Secured on this shaft I by set-screws $i'$ is a series of knife-holders or blocks K, one side of which is straight and provided with a recess into which is fitted the shank of a knife L; or the holder may be cut out to receive a nut after the shank has been placed into it, which nut receives a bolt passed through the holder and knife-shank, thus holding the knife firmly in place. The holders, with the knives, are placed on the shaft in the form of a right-hand screw-thread, so that when the cutting has been accomplished the spiral motion of the knives will spread and move the sheaves into the machine.

The knife-holders may be constructed so as to form a grain-spreader by casting or forming prongs $l$ on the opposite side of the holder from the knife, in which case a less number of knives are necessary. It will be observed that in operation the cutters or knives L and the prongs or spreaders $l$ alternate each other in their action on the sheaves, so that if cut by any one knife it will be spread by the spreaders $l$ of the knife-holder K located on either side of the particular knife having done the cutting.

The front and rear frames, respectively, have journaled thereon cone-pulleys M, connected by a belt $m$, and are driven by a belt $m'$, which passes from the rear cone-pulleys around a pulley $m^2$ on the shaft I, which shaft is driven by a main driving-belt from an engine or other motive-power and passes around the pulley N of a thrashing-cylinder. On the outside shaft of the front cone-pulley there is a pulley $n'$, which has a belt $n^2$ driven by said pulley $n'$ and by means of which the pulley O on the shaft $f'$, which carries the sprocket-wheels $f$, is actuated, which actuates the endless apron. The speed of the endless apron is regulated by means of a belt guide P, having a screw-threaded aperture P′, through which a rod $p$ extends across the top of the machine between the two cone-pulleys, which is journaled in the uprights $p'$. The rod $p$ is provided on one side outside such upright with a crank-handle $p^2$, which by being turned causes the belt-guide P to move the cone-pulley belt, and thus through the medium of the belt and pulley connections to the endless apron, heretofore described, causes the speed of said apron to either increase or decrease, as desired.

A suitable beater R is provided in the rear of the machine and is actuated by a belt $r$ from the front cone-pulley.

A shaker S is provided at the rear of the endless apron, from whence the grain is shaken off into the thrashing-machine. This shaker is secured at one end to a rod S′, which extends across the machine and is journaled in the short arms $s$ of the pivoted crank-arm T. The long arm $s'$ of the crank-arm is provided with a weight T′. A pawl $t$ is secured on the end of the rod S′ and extends in a bent position up over a ratchet-wheel $t'$ on the end of the shaft $f'$, and is provided with an enlarged head $t^2$. By the rotary movement of this shaft $f'$ the ratchet-wheel $t$ is rotated and the head $t^2$ of the pawl engaging said ratchet the shaker is moved up and down and the weight T′ counterbalances the shaker and tends to keep it in its normal position. Although but one crank-arm and its attachments have been described there are two employed.

A right-angled rod U is suspended loosely on the shaft $H^3$ with its horizontal portion $u$ lying parallel with the endless apron and its end resting in a bracket V in the center of the box D, so as to prevent the sheaves from entering the machine crosswise and to keep them in proper position to be cut. When the machine is folded, as shown in dotted lines, Fig. 3, the rod U is thrown back on top of said machine, so as to be entirely out of the way when the machine is transported.

Having fully described my invention, what I claim as new, and desire to secure by Letters Patent, is—

1. In a band-cutter and feeder, the combination, with the shaft I, of a series of combined knife-holders and grain-spreaders, arranged spirally upon the said shaft, and the curved knives secured in said holders opposite the grain-spreaders, substantially as described.

2. A combined knife-holder and grain-spreader constructed in one piece and having a central aperture, said holder being recessed on one side to receive the shank of a knife, the opposite side having spreading prongs formed thereon, substantially as and for the purpose set forth.

3. In combination, in a band-cutter and feeder substantially as described a crank pivoted to the side frame of the cutter and feeder, the long arm of which is provided with a weight, and the short arm adapted to form a journal bearing of the shaker, secured at one end to a rod located inside, said cutter and feeder, and the other end extending outside, for the purpose set forth.

4. The combination of an endless apron, a pivoted bar as *u* extending longitudinally with and above said apron and means for supporting its free end, substantially as and for the purpose specified.

In testimony that I claim the above I have hereunto subscribed my name in the presence of two witnesses.

EDMUND S. WILHITE.

Witnesses:

DAVID SEIBERT,

F. J. MICHEL.